United States Patent [19]

Davies

[11] Patent Number: 5,420,389
[45] Date of Patent: May 30, 1995

[54] BEARING MOUNTS FOR ELECTRIC-RESISTANCE CAN WELDERS

[76] Inventor: Joseph R. Davies, 220 W. Haven, New Lenox, Ill. 60451

[21] Appl. No.: 126,373

[22] Filed: Sep. 24, 1993

[51] Int. Cl.⁶ .................. B23K 11/06; B23K 11/30
[52] U.S. Cl. ............................. 219/84; 219/64
[58] Field of Search ............ 219/64, 81, 82, 83, 219/84

[56] References Cited

U.S. PATENT DOCUMENTS

| | | | |
|---|---|---|---|
| 3,501,611 | 3/1970 | Opprecht | 219/84 |
| 4,433,229 | 2/1984 | Morikawa et al. | 219/84 |
| 4,912,292 | 3/1990 | Hartz | 219/64 |
| 4,940,873 | 7/1990 | Davies | 219/84 |

FOREIGN PATENT DOCUMENTS

| | | | |
|---|---|---|---|
| 57-1583 | 1/1982 | Japan | 219/84 |
| 461817 | 5/1975 | U.S.S.R. | 219/84 |

Primary Examiner—Geoffrey S. Evans
Attorney, Agent, or Firm—Charles F. Lind

[57] ABSTRACT

The disclosed bearing mount includes a bearing with inner and outer raceways and rollers operating between the raceways, the raceways being fixedly held fast relative to separated structures and the rollers rotatably supporting them and the structures relative to one another. The rollers of the bearing are formed of electrically and magnetically nonconductive material, specifically comprised of silicon nitride material. This bearing mount is effective for operation within a pulsed high energy electrical circuit or within the magnetic fields generated thereby, as in an inner roller electrode or an hour glass roll used in an electric-resistance can welder, inasmush as it isolates the structures electrically from one another via the bearing mount independently of other insulator devices, while operating without magnetic roller polarization and increased roller collisions.

18 Claims, 2 Drawing Sheets

BEARING MOUNTS FOR ELECTRIC-RESISTANCE CAN WELDERS

BACKGROUND OF THE INVENTION

Three-piece metal cans frequently are fabricated by forming a flat metal blank, usually rectangular in shape, into a tubular configuration with the lateral ends or edges being lapped and welded together as a longitudinal seam. End closures are then secured across the open ends of the tubular configuration to complete the can formation. The term "tubular" is not restricted to a circular cross-section, as square or other shaped cans can be fabricated with this same approach. Continuously welded seams can also be used for fabricating structures other than cans.

To make a seam weld in electric-resistent can welders, opposed roller electrodes are continuously tracked along the lapped blank edges, one on the inside and one on the outside of the tubular configuration, as the blank is moved between the rotating electrodes and a large welding current pulsed between the opposed electrodes is conducted through the lapped edges at the small contact regions between the electrodes, heating the edges to a mastic state as a series of closely adjacent "spot welds" for producing a smooth weld seam.

The steel blanks typically have a thin protective surface coating, such as of tin; but as such coating has relatively poor conductivity and in order to minimize the needed welding currents, the blank edges to be lapped are generally not coated. Nonetheless, welding heat can splatter the coating; and splatter accumulations on the roller electrode surface increase electrical resistance and the needed welding current, and reduce the weld quality. To counter this, a copper wire electrode aligned along each exposed lapped blank edge is fitted in a circumferential groove on the adjacent roller electrode, and the wire electrodes are squeezed under a significant compressive force between the opposed roller electrodes and respective blank edges.

The outer roller electrode is rotated under power, sychronized with the can blank conveyor, and effectively rotates the inner roller electrode and advancing blank edges and wire electrodes as the seam is being welded. Increased resistance against free inner electrode rotation and/or increased welding current and temperatures, can cause localized heating or straining of the wire electrode and can break it. Should the wire electrode break, the operation of the can welder must be immediately halted, or direct shorting and/or arcing between the roller electrodes can burn and operatively destroy them.

Modern automatic can welders operate at very high amperage and power levels, and at linear welding speeds in excess of 70 meters per minute for yielding production rates in excess of 600 cans per minute. Equipment and material suppliers suggest higher welding power levels and output rates will soon be possible or required, for example by improved electronically produced power wave forms and frequencies. In fact, actual and proposed shifts to economical can blank materials suggest the need of higher power levels on existing can welders to form suitable welds.

One continuing development effort relates to improving inner roller electrodes, which must carry the electrical power between gapped moving parts, such as between a stationary stator supported by the welder frame and a rotor rotatably carried on the stator and shaped to roll along the lapped blank edges. Roller bearings between the gapped stator and rotor components allow for the relative rotation, and insulators encasing the bearings electrically isolate the gapped stator and rotor components from one another. Electrically conductive means, most commonly in the form of an electrically conductive liquid but also in the form of special mechanically cooperating contacts, are contained between the gapped stator and rotor components to provide a specific intended path for the required welding amperage.

Conventionally, the electrically conductive means has been via a conductive liquid sealed between the stator and rotor components, and mercury has been extensively used as it withstands the high electrical power levels while remaining a liquid. However, its conductivity is only about 2% that of the conventional cooper alloy roller electrodes, and thus represents a disproportionately large part of the overall electrical resistance against the welding current. Moreover, as mercury is highly toxic, including its vapor which can be released even at room temperatures, whereby current workplace regulations, environmental restrictions, and the potential of consequential liability now are challenging its use.

My prior U.S. Pat. No. 4,780,589 issued on Oct. 25, 1988; U.S. Pat. No. 4,940,873 issued on Jul. 10, 1990; and U.S. Pat. No. 5,089,862 issued on Feb. 18, 1992, each related to ROLLER ELECTRODES FOR ELECTRIC-RESISTANCE WELDING MACHINE that totally eliminated mercury and its consequential liability as the electrically conductive liquid, and further offered improved weld output and quality.

My improved roller electrodes use a substantially non harmful conductive liquid comprised as a gallium dominant eutectic mixture, by weight approximating 61% gallium (Ga), 25% indium (In), 13% tin (Sn), and 1% zinc (Zn), which has electrical and thermal conductivities almost four times better than mercury. The electrode surfaces exposed to the conductive liquid or intense welding currents further are coated with a very thin layer of a platinum family material, preferably rhodium. A control limits the temperature of the coolant circulated through the roller electrodes to above approximately 10 degrees C.

One cause of roller electrode failures and/or wire electrode breakages is the increased drag against rotor rotation exhibited in most failed electrodes. Mercury knowingly contributes to the increased drag, as when it is exposed to the copper alloy electrode components, it converts from a liquid to an amalgam that begins pasty but eventually becomes rock hard. With respect to this phenomenon, for improving shelf life it has long been recommended to store a filled but unused mercury roller electrode at a chilled temperature and to move it regularly. For this reason and also in an effort to eliminate the liability of handling a mercury product, electrode suppliers have recently tried to ship the roller electrode empty and require the user to fill it with mercury when use is to begin. Even my roller electrodes exhibit conductive liquid breakdown, except only to becoming pasty and not rock hard like the mercury amalgam.

Increased rotor drag is also caused by failed roller bearings. Specifically, each roller bearing generally is comprised of inner and outer raceways separated by many small balls constrained therebetween, with some circumferential spacing between the balls. The balls thus can roll along and between the raceways, overall moving circumferentially in the same direction as the rotor rotation. Close tolerances and smoothness of the component surfaces, and good lubrication are required for free ball movement. Most failed bearings suggest operation while hot and/or dirty, with roughened surfaces and burnt lubricant; so corrective design efforts have attempted to improve bearing quality, seals, cooling and/or lubrication.

Notwithstanding these known potential causes for failure and grand efforts to eliminate them, and despite generally overall improved roller electrode operation, the inconsistency and lack of predictability of roller electrodes operation have always frustrated design efforts for improving these devices.

However, the inventor now has determined that a major cause of roller electrode failure relates to ineffective bearings between the stator and rotor. In analyzing the problem, the inventor specifically notes that the bearings operate very close to the welding regions, within a few centimeters, and thus are within the high energy pulsed electrical fields used in the can welder. Further, the bearing raceways and balls are typically formed of a very hard bearing steel, which is both electrically and magnetically conductive.

One aspect of the problem is that although many balls are in each bearing, only those few balls instanteously located closely adjacent and on opposite sides of the force line through the bearing center and only on the loaded side of the bearing actually support the bearing load. Meanwhile, the other balls carry little or even none of the load and thus frequently can be shifted circumferentially until restrained by a cage or by the adjacent ball. Larger roller electrodes, possibly 65 mm OD or larger, offer sufficient space to use bearings having ball restraining cages; while smaller roller electrodes with less available space frequently use cageless bearings. The pulsed electrical circuit at the welding region generates a high energy magnetic field, and because the bearings can be very proximate to the welding region, the steel bearing components can be polarized. When the freely moveable and polarized balls are alternately attracted and/or repelled relative to one another, high impact collisions locally concentrated at the ball/ball or ball/cage interfaces will occur, which are believed to be a main but unappreciated cause of spald spots, or roughness observed in failed bearings.

Another aspect of the problem is traced to the cup-shaped anodized aluminum insulators commonly used to electrically isolate the gapped stator and rotor components from one another, which knowing have only a very thin anodized layer typically less than 0.002 mm thick. The inventor has determined that the assembly step of press-fitting each insulator between the rotor and the outer bearing raceway, to keep them from shifting relative to one another during operation, frequently scratches the thin anodized layer sufficiently to reduce or break down the effective insulation. This short circuit path via the steel bearings between the stator and rotor components, and the limited ball/race interfaces, can generate arcing and/or high current densities and component temperatures; each leading to overheating and burnt lubricant, and the generation of spald spots.

While inner roller electrodes are known to be problemsome, so too are the forming rolls (commonly known as hour glass rolls) used to shape the originally flat blank into the cylindrical can shape, which also are very small with very small bearings and operate in the same high energy pulsed electrical fields of the can welder. In fact, two such rolls have bearings located generally as close to the welding region as the inner roller electrode bearings. These rolls occasionally have exhibited increased drag against rotation, precluding proper blank movement past the roller electrodes. While roll bearings are not subjected to electrical power, their steel construction and operation in the high energy fields of the can welder can lead to magnetic polarization, poor operation and ultimate failure.

SUMMARY OF THE INVENTION

This invention provides improved bearing mounts for electric-resistance welder components, including the roller electrode and hour glass roll, for minimizing the normally adverse effects of operating within the high energy pulsed electrical fields associated with the conventional can welder.

A basic object of this invention is to provide improved insulation between the stator and moving rotor, specifically in the region of the bearing mounts between these components, in order to yield a higher consistency of welder operation.

A more detailed object of this invention is to provide improved bearing mounts between the stator and moving rotor, and in the hour glass rolls, specifically including bearings of the type having inner and outer raceways and balls operating between the raceways, that operates independently of the high energy electrical and magnetic fields.

Specific features of this invention includes providing improved roller electrodes and/or hour glass rolls suited to operate reliably in high energy pulsed electrical fields associated with the conventional can welder, the improved constructions including the use of roller bearings formed of material that is both electrically and magnetically nonconductive, including having the inner and/or outer raceways and/or balls trapped therebetween formed of a ceramic material silicon nitride.

BRIEF DESCRIPTION OF THE DRAWINGS

The disclosure of the present invention includes the accompanying drawings, in which.

DETAILED DESCRIPTION OF AN ILLUSTRATED EMBODIMENT

Figure 1:
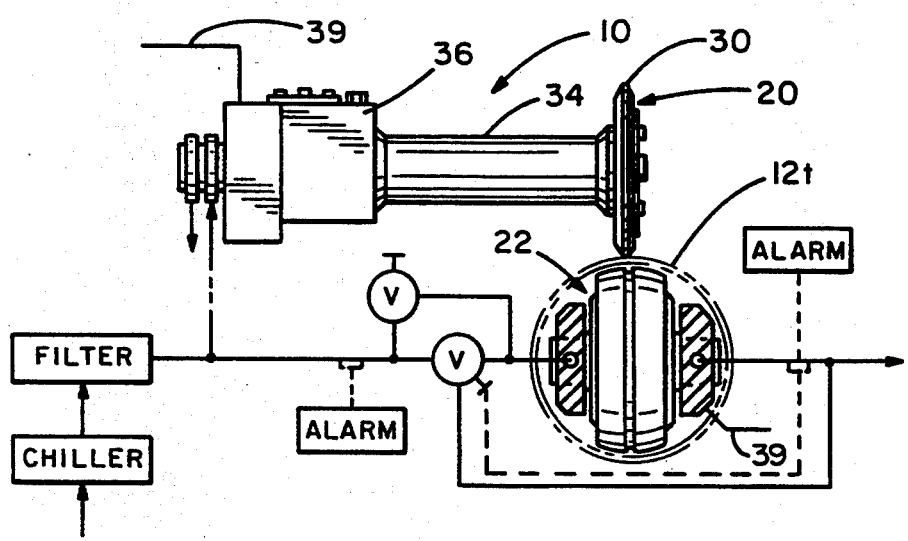
FIG. 1 is an elevational section view of one model of electric-resistance can welder, as seen in a direction axially in line with the movement of the can blanks generally from line 1—1 in FIG. 3, and illustrating in phantom a tubular can blank and inner and outer roller electrodes cooperating therewith.
Figure 3:
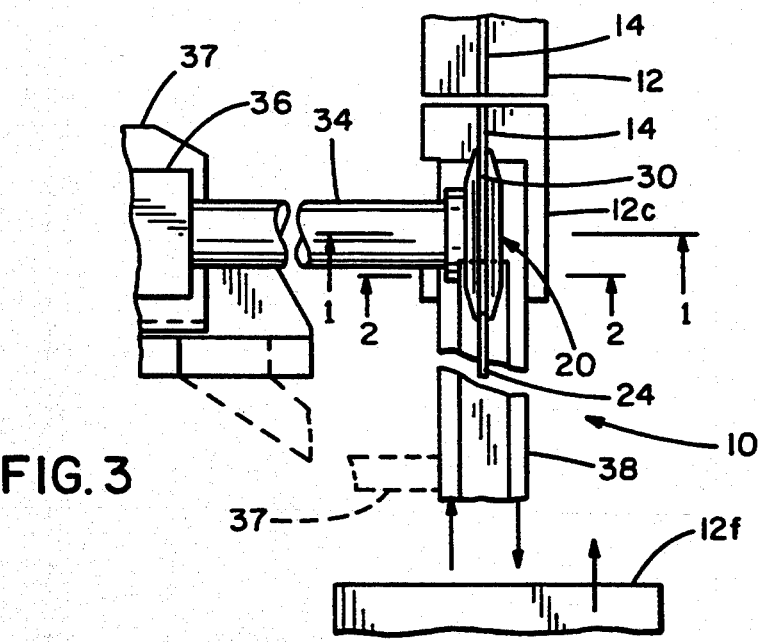
FIG. 3 is a top plan view of FIG. 1, except without the structures of FIG. 2 for sake of clarity of disclosure.

The illustrated roller electrode components of an electric-resistance can welder 10 are adapted to weld can blanks 12 along longitudinal seams 14, formed where opposite edges of each blank are overlapped slightly. The can blanks 12 will be moved in the direction of the seams 14 in somewhat spaced edge-to-edge relation, starting flat as illustrated at 12f in FIG. 3 and then being reshaped by conventional reforming structure, including hour glass rolls 16 to a tubular configuration 12t (shown in phantom only in FIG. 1) with the blank edges overlapped. Outer and inner roller electrodes 20 and 22, respectively identified relative to the tubular configuration 12c, lie next to the lapped blank edges, and intermediate copper wire electrodes 24 fit in annular grooves 30, 32 formed in the electrodes and bear directly against the overlapped blank edges.

The outer roller electrode 20 is keyed to one end of elongated shaft 34 rotatably mounted at its opposite end at bearing housing 36. The bearing housing 36 is adjustably secured to welder frame 37 to orient the shaft 34 substantially perpendicular to movement of the blanks 12 and to the formed seams 14. The inner roller electrode 22 is rotatably mounted at one end of elongated arm 38 which parallels the blank movement, and the opposite arm end is adjustably supported relative to the welder frame 37, where the blanks are flat or just beginning to be reshaped to be tubular. The inner roller electrode 22 will thus be located at the downstream end of the arm 38, relative to the blank movement.

A pulsed welding current is carried between appropriate conductors 39 (FIG. 1), via the outer roller 20, the sandwiching copper wires and overlapped can blank edges, and the inner roller 22 and support arm 38; and electrical contact means allow the needed relative movements bearing the housing 36 and shaft 34, and between the inner roller 22 and support arm 38. Because its size is not limited and because its location is spaced significantly from the actual welding region between the roller electrodes 20 and 22, conventional electrical contact means (not shown) provided between the bearing housing 36 and shaft 34 prove adequate and form no part of this invention.

Figures 4, 5:
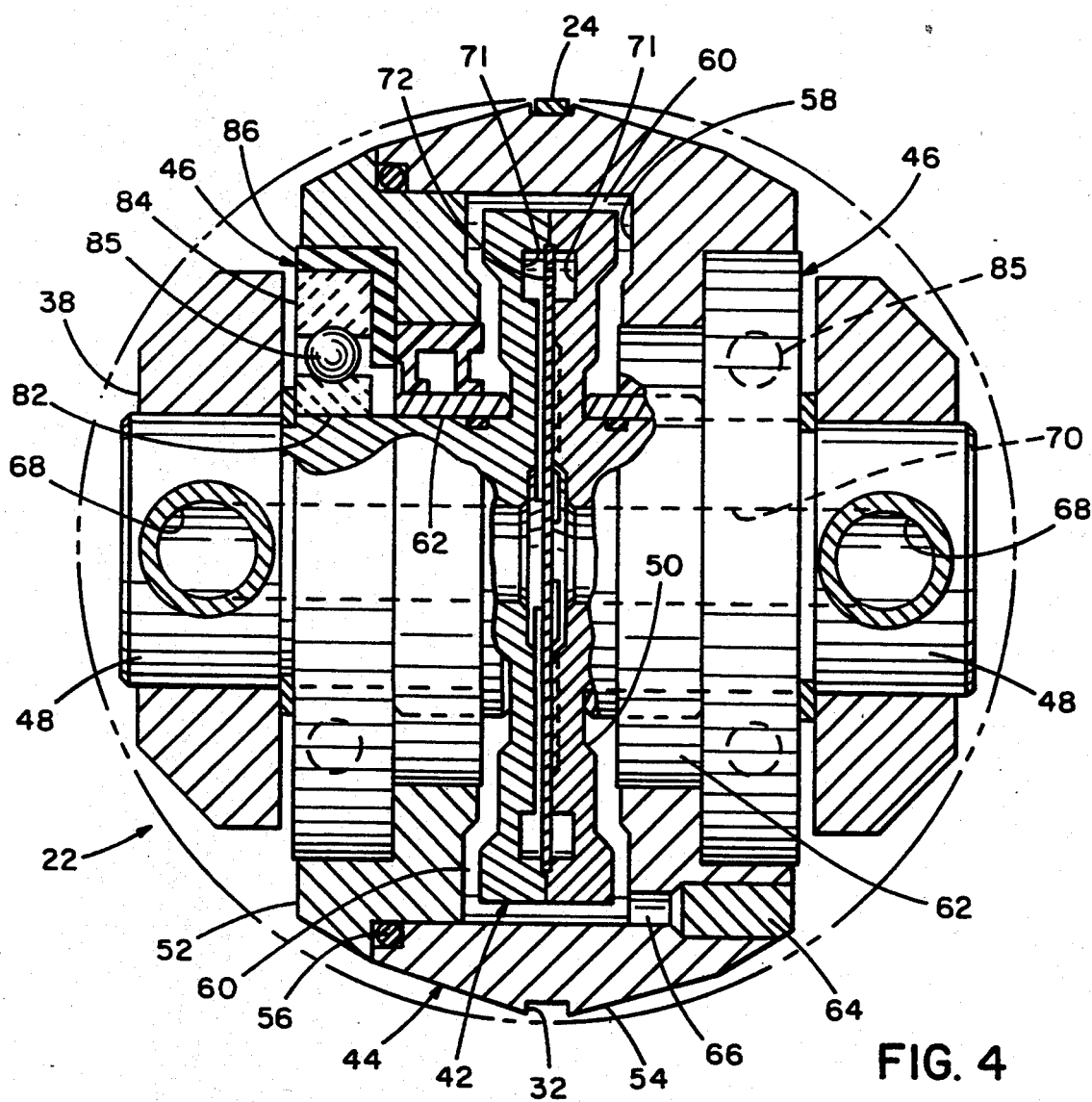
FIG. 4 is an enlarged center section view of the inner roller electrode, corresponding generally to that illustrated in FIGS. 1 and 2.
FIG. 5 is an enlarged partical center section view of the one hour glass roll, corresponding generally to that illustrated in FIGS. 1 and 2.

The inner roller electrode 22 (see FIG. 4) has a stator 42 and a rotor 44 supported by a bearing mount 46 to rotate on the stator 42 about an axis disposed transverse to the blank movement and to the formed seams. The stator 42 includes extended ends 48 keyed nonrotatably to the inner roller electrode support arm 38, and a central disc 50 between the extended ends 48. The rotor 44 typically has two adjacent sections 52 and 54 press-fit or otherwise secured together and sealed by O-ring 56 at the overlapping joint. The joined rotor sections 52 and 54 define a cavity 58 larger than the stator disc 50; and the generally concentric stepped adjacent faces of each are closely spaced from one another across peripherial and opposed side gaps 60. Seal means 62 make the defined cavity 58 between the stator and rotor components liquid tight.

Conductive liquid (such as mercury or the gallium dominant liquid recited in my mentioned patents) fill approximately 80–90% of this cavity 58, plug 64 closing the fill tap 66. The conductive liquid bridges the gaps 60 between the stator and rotor components, electrically and thermally connecting them together while allowing them to rotate relative to one another.

Axially extended passages 68 formed in the frame arms 38 communicate with one another via internal stator passages 70, 71, 72 to allow liquid coolant to be circulated through the stator for cooling it. The rotor 44 is cooled primarily by the same coolant, except via the thermal conductivity of the conductive liquid contained in the cavity 60.

Figure 2:
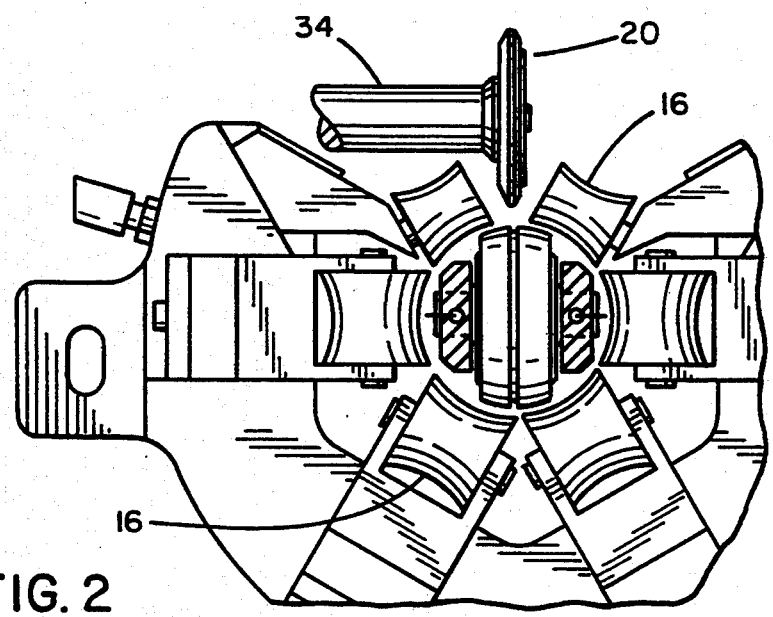
FIG. 2 is a view similar to FIG. 1, except with the sight plane being generally from line 2—2 in FIG. 3 shifted slightly axially upstream from line 1—1, specifically illustrating hour glass rolls used in the tubular formation of the can blank, and showing structures of FIG. 1 for reference only.

The blank reforming hour glass rolls 16 (see FIGS. 2 and 5) have a structural contoured metal body 77 that directly engages and roll along each can blank 12 as it is being shaped, and bearing mounts 79 between the body and frame shaft 91 rotatably support the body for movement along the can blank.

The conventional bearing mounts 46 and 79 include roller bearings having raceways and balls operatively interposed therebetween. Electrode bearing mount 46 has a roller bearing with inner and outer annular raceways 82 and 84 respectively held fast relative to the stator and rotor components, and balls 85 between the raceways; and a cup-shaped annular anodized aluminum insulator 86 is interposed between and fixedly held fast, as by a press fit, relative to both the rotor 44 and the outer raceway. Roll bearing mount 79 has a roller bearing with inner and outer raceways 88 and 89 respectively held fast relative to the roll body 77 and frame shaft 91, balls 92 between the raceways, and annular cage 93 over the balls; and an annular insulator 94 is interposed fixedly between the roll body and outer bearing raceway.

The wire electrodes 24 riding in the circumferential roller electrode grooves 30 and 32, are aligned in the direction of the can seam 14 being formed and are squeezed under a significant compressive force between the opposed roller electrodes and the overlapped blank edges. This region between the roller electrodes is the actual welding region. It is appreciated that the electrode roller bearing balls 85 are in very close proximity to this welding region, and at least the roller bearing balls 92 in the pair of hour glass rolls 16 on opposite sides of and immediately adjacent the copper wire electrode 24 are comparably proximate the welding region.

The ball and raceway components of such roller bearings are conventionally of bearing steel, such as four forty steel, because of the needed physical properties of exceptional hardness, fracture toughness, flexure strength, and machinability. However, such bearing steel is also both electrically conductive and magnetic.

The invention provides improved bearing mounts 46 and 79 that greatly enhance the overall performance and reliability of the components and the can welder. Specifically, the bearing balls 85, 92 and possibly the raceways 82 and 84, and 88 and 89, and cage 93 are formed of electrically nonconductive and nonmagnetic material having the precise physical properties and specifications needed for this application. Silicon nitride, a ceramic material having all such needed physical properties and specifications, and more, is proposed for use in this application; and silicon nitride ball and/or raceway components are commercially available.

The electrically nonconductive silicon nitride bearings greatly improve existing problem areas experienced with inner roller electrodes and hour glass rolls. Specifically, in the roller electrode, such bearing mounts isolate the stator and rotor components electrically from one another to minimize or eliminate conduction of the electrical welding current via the bearings, even should the conventional bearing mount insulators 86 fail, which the inventor has found to be quite common. Eliminating the possible short circuit path via the bearing balls and raceways, especially because of the limited ball/raceway contact areas or interfaces, significantly reduces or eliminates arcing and/or high current densities and component temperatures at these interfaces, and promotes cooler bearing operation and longer bearing life, and avoids common problems of spald spots, overheating, burnt lubricant and failure of the conventional bearing mounts.

Also, improved operation will be achieved due to the bearing balls and/or raceways not being influenced by the strong magnetic fields generated with the high intensity electrical power levels used in the can welder, eliminating entirely magnetic polarization of the balls and resulting enhanced high impact ball collisions. Thus, the smoothness and finish of the ball and raceway surfaces will not be impaired, allowing for sustained efficient operation of the roller electrode and forming rolls.

Additionally, silicon nitride has important physical properties that meets or even exceeds those of the conventional steel bearings. Specifically, the silicon nitride bearing components will be about 2 times harder than but only about 0.4 times as dense as bearing steel, will have at least 10 times the fracture toughness and flexure strength of bearing steel, and can have fabricated to have exceptionally high tolerance and surface smoothness and finish, for reduced rolling friction. Also, the silicon nitride bearing components will have more than 4 times the heat resistance but only about 0.3 times the thermal expansion of bearing steel, and will withstand operating temperatures of 1000 degrees F. while resisting corrosion and galling.

The improved bearing mounts comprised of the silicon nitride bearing components provide low friction easy roller movement over a sustained duration. Moreover, even should the lubricant be burnt off, and no other components fail, operation can be continued more so than conventional steel bearing components, thereby avoiding total failure and stoppage of the can welder.

The improved bearing mounts will have the balls or rollers, and can also have the inner and outer raceways, formed of the silicon nitride material. However, because silicon nitride is very expensive, use of silicon nitride balls or rollers alone and conventional 440 SST raceways, commonly called a hybrid bearing, might be more commercially practical. In fact, hybrid bearings having only the rollers formed of silicon nitride, with steel raceways, will operate with greatly improved efficiency compared to conventional steel bearings, inasmuch as electrical arcing at the roller/raceway contact areas will be eliminated with the nonconductive rollers and the nonmagnetic rollers will operate without magnetic polarization and the resultant increased occasion of roller impacts.

The ball cage 93 of roller bearing 79, fitted around the balls in the space between the inner and outer raceways and spaced radially from both raceways for holding the balls circumferentially spaced apart, would preferably also be formed of a nonconductive and nonmagnetic material, but not of silicon nitride because of its high material and fabricating costs, but instead would be formed of a phenolic material. A dust shield (not shown) further would normally be fitted in the outside or exposed side of the bearing, in the region between the inner and outer raceways and spaced from at least one of the raceways and from the balls but otherwise shielding the balls from the outside atmosphere; but nonconductive and nonmagnetic shielding is available, such as being formed of woven stainless steel wire screen covered by Teflon coated glass fabric, and thus need not be eliminated from or changed in the improved bearing mount.

The electric resistance can welder using the improved bearing mount components including the inner roller electrode and/or forming rolls thus will provide more reliable and predictably sustained operation, notwithstanding the close presence of its pulsed high energy electrical fields. Specifically, operation of these components formed according to the invention have provided can production as much as 40% greater than related operation with conventional bearing mount components.

While the bearings have been illustrated with balls, rollers or other forms could be used instead, likewise being formed of the nonconductive and nonmagnetic silicon nitride. Also, while the specific bearing mounts have been shown with respect to the roller electrode and forming roll of an electric-resistance welder, the same advantages can be obtained from the use of like mounts in other types of applications faced with related needs and problems. Accordingly, the invention is to be limited only by the scope of the appended claims.

What is claimed as my invention is:

1. In an electric-resistance welder having hour glass rolls forming a blank into a tubular shape with overlapped blank edges, opposed inner and outer roller electrodes and intermediate wire electrodes sandwiched between the overlapped blank edges and opposed roller electrodes, whereby pulsed high energy electrical current carried between the roller electrodes via the overlapped blank edges and intermediate wire electrodes provides for seaming the overlapped blank edges to form a tubular body, the inner roller electrode including stator and rotor components and the hour glass rolls including contoured body and shaft components, and bearing mounts for rotatably supporting these respective components relative to one another, comprising the combination of the bearing mount including a bearing having inner and outer raceways and balls operating between the raceways, the raceways being held fast relative to the respective components; and the bearing balls being formed of electrically and magnetically nonconductive material having the physical properties of being substantially inelastic and harder than and with fracture toughness greater than bearing steel, of withstanding operating temperatures of 1000 degrees F. while resisting corrosion and galling, and of being fabricated to exceptional high tolerance and surface smoothness and finish for reduced rolling friction.

2. The electric-resistance welder combination according to claim 1, further comprising the bearing balls being of silicon nitride material.

3. The electric-resistance welder combination according to claim 1, further comprising the raceways being formed of electrically and magnetically nonconductive material having the physical properties of being substantially inelastic and about 2 times harder than but only about 0.4 times as dense as bearing steel and of being at least 10 times the fracture toughness of bearing steel, of withstanding operating temperatures of 1000 degrees F. while resisting corrosion and galling, and of being fabricated to exceptional high tolerance and surface smoothness and finish for reduced rolling friction.

4. The electric-resistance welder combination according to claim 3, further comprising the raceways being of silicon nitride material.

5. The electric-resistance welder combination according to claim 1, further comprising the raceways being of electrically and magnetically nonconductive material having the physical properties of being substantially inelastic and harder than and with fracture toughness greater than bearing steel, of withstanding operating temperatures of 1000 degrees F. while resisting corrosion and galling, and of being fabricated to exceptional high tolerance and surface smoothness and finish for reduced rolling friction, and the bearing balls and raceways being formed of silicon nitride material.

6. The electric-resistance welder combination according to claim 1, further comprising annular cage means circumferentially holding and separating the rollers relative to one another, the cage means being radially spaced from the raceways, and the raceways and cage means being formed of electrically and magnetically nonconductive material.

7. The electric-resistance welder combination according to claim 6, further comprising the raceways being formed of silicon nitride material having the physical properties of being about 2 times harder than but only about 0.4 times as dense as bearing steel and of being at least 10 times the fracture toughness and flexure strength of bearing steel, of withstanding operating temperatures of 1000 degrees F. while resisting corrosion and galling, and of being fabricated to exceptional high tolerance and surface smoothness and finish for reduced rolling friction.

8. The electric-resistance welder combination according to claim 6, further comprising the cage means being formed of a phenolic material.

9. The electric-resistance welder combination according to claim 1, further comprising the raceways being formed of steel bearing material, and being electrically and magnetically conductive.

10. In combination, an electric-resistance welder having hour glass rolls for forming a generally flat blank into a tubular shape with overlapped blank edges, opposed inner and outer roller electrodes, intermediate wire electrodes sandwiched between the overlapped blank edges and opposed roller electrodes, whereby pulsed high energy electrical current can be carried between the roller electrodes via the overlapped blank edges and intermediate wire electrodes to weld a linear seam along the overlapped blank edges and form a tubular body, the inner roller electrode including a stator and a rotor, bearing mounts for rotatably supporting the rotor from the stator, each bearing mount including a bearing having components including inner and outer raceways and balls operating between the raceways, a cup-shaped annular insulator interposed between and fixedly held fast relative to both the rotor and to the outer raceway and the inner raceway being held fast relative to the stator, and the balls being of electrically and magnetically nonconductive material having the physical properties of being substantially inelastic and harder than and with fracture toughness greater than bearing steel, of withstanding operating temperatures of 1000 degrees F. while resisting corrosion and galling, and of being fabricated to exceptional high tolerance and surface smoothness and finish for reduced rolling friction, effective for isolating the stator and rotor electrically via the bearing mounts even should the cup-shaped annular insulator fail and for operating independently of magnetic forces generated by the pulsed high energy welding current.

11. The electric-resistance can welder combination according to claim 10, further comprising the rollers being formed of silicon nitride material.

12. The electric-resistance can welder combination according to claim 11, further comprising the raceways being formed of electrically and magnetically nonconductive silicon nitride material having the physical properties of being substantially inelastic and harder than and with fracture toughness greater than bearing steel, of withstanding operating temperatures of 1000 degrees F. while resisting corrosion and galling, and of being fabricated to exceptional high tolerance and surface smoothness and finish for reduced rolling friction.

13. The electric-resistance welder combination according to claim 12, further comprising annular cage means circumferentially holding and separating the balls relative to one another, the cage means being radially spaced from the raceways, and the cage means being formed of electrically and magnetically nonconductive material.

14. The electric-resistance welder combination according to claim 13, further comprising the cage means being formed of a phenolic material.

15. In combination, an electric-resistance welder having hour glass rolls for forming a generally flat blank into a tubular shape with overlapped blank edges, opposed inner and outer roller electrodes sandwiching the overlapped blank edges, whereby pulsed high energy electrical current can be carried between the roller electrodes via the overlapped blank edges to provide for seaming the overlapped blank edges to form a tubular body, each roll having a contoured roll body and a bearing mount for rotatably supporting the roll body from the welder, each bearing mount including a bearing having components including inner and outer raceways and balls operating between the raceways, and the balls being of electrically and magnetically nonconductive material having the physical properties of being about 2 times harder than but only about 0.4 times as dense as bearing steel and of being at least 10 times the fracture toughness and flexure strength of bearing steel, of withstanding operating temperatures of 1000 degrees F. while resisting corrosion and galling, and of being fabricated to exceptional high tolerance and surface smoothness and finish for reduced rolling friction for operating independently of magnetic forces generated by the pulsed high energy welding current.

16. The electric-resistance welder combination according to claim 15, further comprising the balls being formed of silicon nitride material.

17. The electric-resistance welder combination according to claim 16, further comprising the raceways being formed of electrically and magnetically nonconductive silicon nitride material having the physical properties of being about 2 times harder than but only about 0.4 times as dense as bearing steel and of being at least 10 times the fracture toughness and flexure strength of bearing steel, of withstanding operating temperatures of 1000 degrees F. while resisting corrosion and galling, and of being fabricated to exceptional high tolerance and surface smoothness and finish for reduced rolling friction.

18. The electric-resistance welder combination according to claim 17, further comprising annular cage means circumferentially holding and separating the balls relative to one another, the cage means being radially spaced from the raceways, and the cage means being formed of electrically and magnetically nonconductive material.

* * * * *